US005766514A

United States Patent [19]

Dougill et al.

[11] Patent Number: 5,766,514

[45] Date of Patent: Jun. 16, 1998

[54] METHOD OF STORING ACETYLENE

[75] Inventors: Silvia Beatriz Dougill, London; Wasyl Michael Sajik, Camberley, both of England; Shuen-Cheng Hwang, Chester, N.J.

[73] Assignee: The BOC Group plc, Windlesham, England

[21] Appl. No.: 612,040

[22] Filed: Mar. 7, 1996

[30] Foreign Application Priority Data

Apr. 25, 1995 [GB] United Kingdom ................... 9504736

[51] Int. Cl.[6] ............................ C06D 15/00; C09K 3/00; C10L 3/00

[52] U.S. Cl. ................................................ 252/372; 585/6

[58] Field of Search ................................ 585/6; 252/372; 62/46.1

[56] References Cited

U.S. PATENT DOCUMENTS 3,861,160 1/1975 Walker .

5,531,075 7/1996 Behringer .

FOREIGN PATENT DOCUMENTS 982 678 1/1949 France .

729 748 2/1952 United Kingdom .

729748 5/1955 United Kingdom .

OTHER PUBLICATIONS

CRC Handbook of Chemistry and Physics.

*Primary Examiner*—Gary Geist

*Assistant Examiner*—Karl J. Puttlitz, Jr.

*Attorney, Agent, or Firm*—Coleman R. Reap; Salvatore P. Pace

[57] ABSTRACT

A method of storing and transporting acetylene comprises mixing acetylene gas and carbon dioxide gas and then reducing the temperature of the gas mixture thus obtained to obtain either a liquid-vapour or solid-vapour mixture and storing the liquid-vapour mixture or solid-vapour mixture in a pressure vessel.

5 Claims, 2 Drawing Sheets

METHOD OF STORING ACETYLENE

FIELD OF THE INVENTION

The present invention relates to the storage and transportation of acetylene.

BACKGROUND OF THE INVENTION

Acetylene has utility in industry in particular gas welding and gas cutting operations but has the disadvantage that it is highly unstable. If an ignition source is present, pure acetylene under pressure as low as 1.4 bar absolute will decompose with violence.

One known method of stabilising acetylene is to dissolve the acetylene in a suitable solvent, for example acetone, to lower its activity. The resulting solution is then absorbed in a porous mass or filler to inhibit the decomposition. With this known method, using acetone as the solvent, acetylene gas cylinders have a limiting safety pressure of 18.7 bar absolute at 15° C.

The main disadvantages of this known dissolved acetylene storage system are low storage capacity, low gas withdrawal rates, and no bulk storage or transportation capabilities.

An alternative to dissolved acetylene is to dilute the acetylene gas with another gas. Hydrocarbons, nitrogen, carbon dioxide, carbon monoxide and ammonia are the most common gases used to dilute and thereby stabilise acetylene. Dilution with 49% by volume nitrogen or 42% by volume carbon dioxide is needed to avoid acetylene decomposition at 25° C. and a pressure of 6 bar. Although the addition of diluents increases the pressure at which acetylene can be handled safely, the storage capacity and bulk transportation capability of acetylene are not improved.

Another alternative is to liquefy acetylene in a solvent at low temperatures, for example −90° C. at atmospheric pressure. For example, in UK Patent Number 729748 there is described a process for producing dissolved acetylene in which gaseous acetylene is dissolved at atmospheric pressure at a temperature of −94° C. or below in a solvent such as liquid carbon dioxide preferably in admixture with acetaldehyde and methylene chloride. The disadvantages are the high cost of the extreme cooling, the change of composition during withdrawal of either the vapour or the liquid and, the low pressure of the acetylene stored.

A third alternative is to store or transport liquid mixtures of acetylene and for example acetone or dimethylformamide at a temperature of −50° C. In this case, the equilibrium pressure is higher than atmosphere and, the vapour has to be stabilised by adding a gas insoluble in the liquid like, nitrogen, noble gases or carbon monoxide. The disadvantages are the difficulties in maintaining a safe gas composition and the contamination of acetylene by the other component of the/mixture.

It is an aim of the present invention to provide an improved method for the storage and the bulk transportation of acetylene.

SUMMARY OF THE INVENTION

According to one aspect of the present invention a method of storing acetylene comprises the steps of mixing acetylene gas and carbon dioxide gas; reducing the temperature of the gas mixture thus obtained to obtain a liquid-vapour or solid-vapour mixture and storing the liquid-vapour or solid-vapour mixture in a pressure vessel.

Preferably, the gas mixture contains 50% to 90% by volume of acetylene the remainder being carbon dioxide.

Preferably, the liquid-vapour or solid-vapour mixture is of azeotropic composition.

In a preferred embodiment the mixture is at temperatures below the mixture critical temperature.

According to a further aspect of the present invention, an apparatus for storing acetylene comprises a source of acetylene gas under pressure, a source of carbon dioxide gas under pressure, a mixing vessel for receiving a predetermined volume of acetylene gas and carbon dioxide gas to produce a gas mixture, means for lowering the temperature of the gas mixture to a liquid-vapour state or a solid vapour state and a pressure vessel for receiving said liquid-vapour or solid-vapour mixture.

Embodiments of the invention will now be described, by way of example, reference being made to the Figures of the accompanying diagrammatic drawings in which:

DETAILED DESCRIPTION OF THE INVENTION

Figure 1:
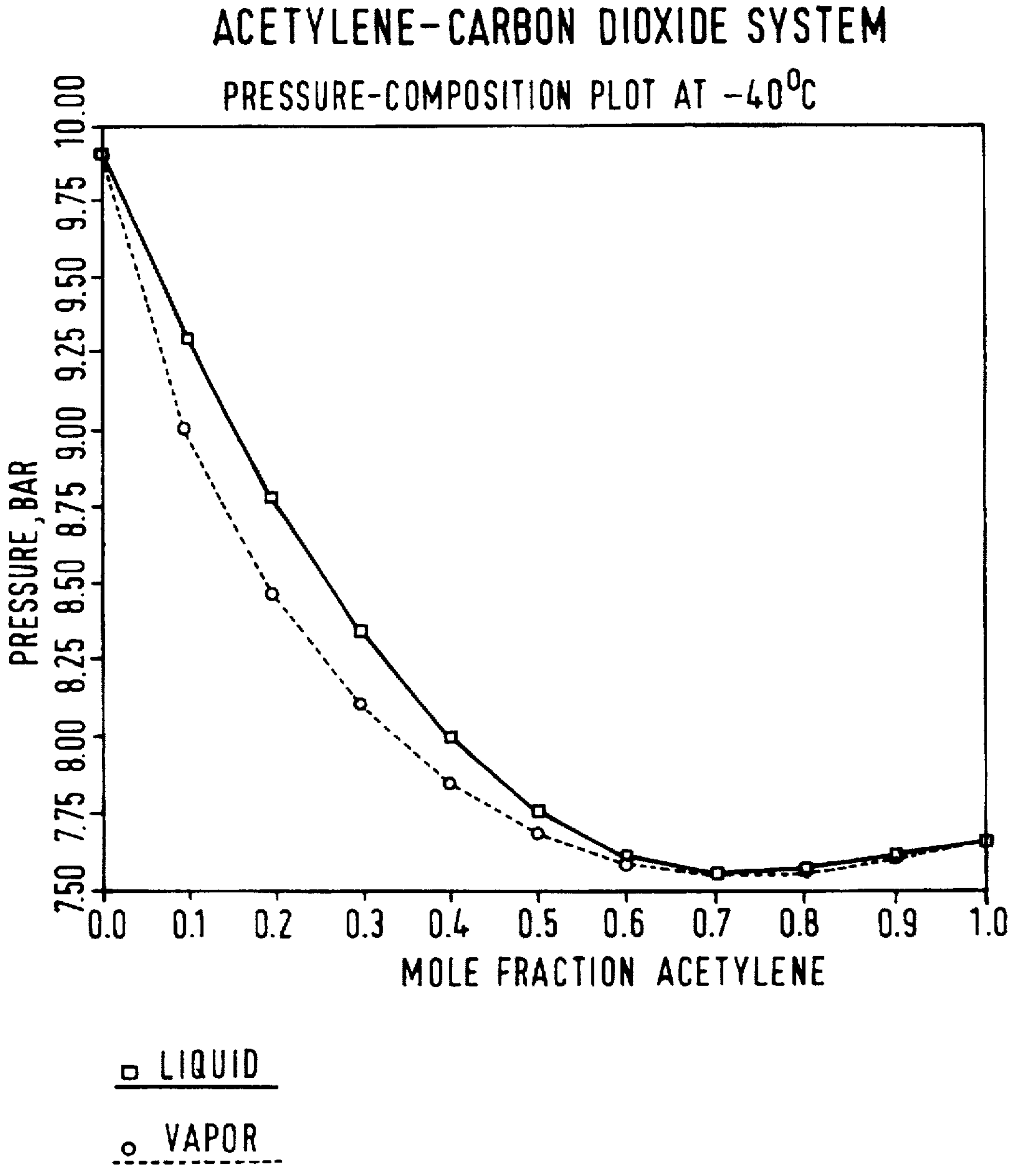
FIG. 1 is a pressure-composition diagram for the binary system of acetylene and carbon dioxide at a temperature of −40° C.

FIG. 1 illustrates complete solubility and the formation of an azeotrope. Advantage is taken of these by mixing acetylene gas with carbon dioxide, gas, to render a liquid or solid mixture, preferably of azeotropic composition, at the required pressure and temperature. Calculations indicate that the acetylene-carbon dioxide binary system forms an azeotropic mixture at the temperatures between −15° C. and −85° C. The azeotrope composition contains acetylene in the range of 50% to 90% by volume, depending on the system temperature and pressure.

Figure 2:
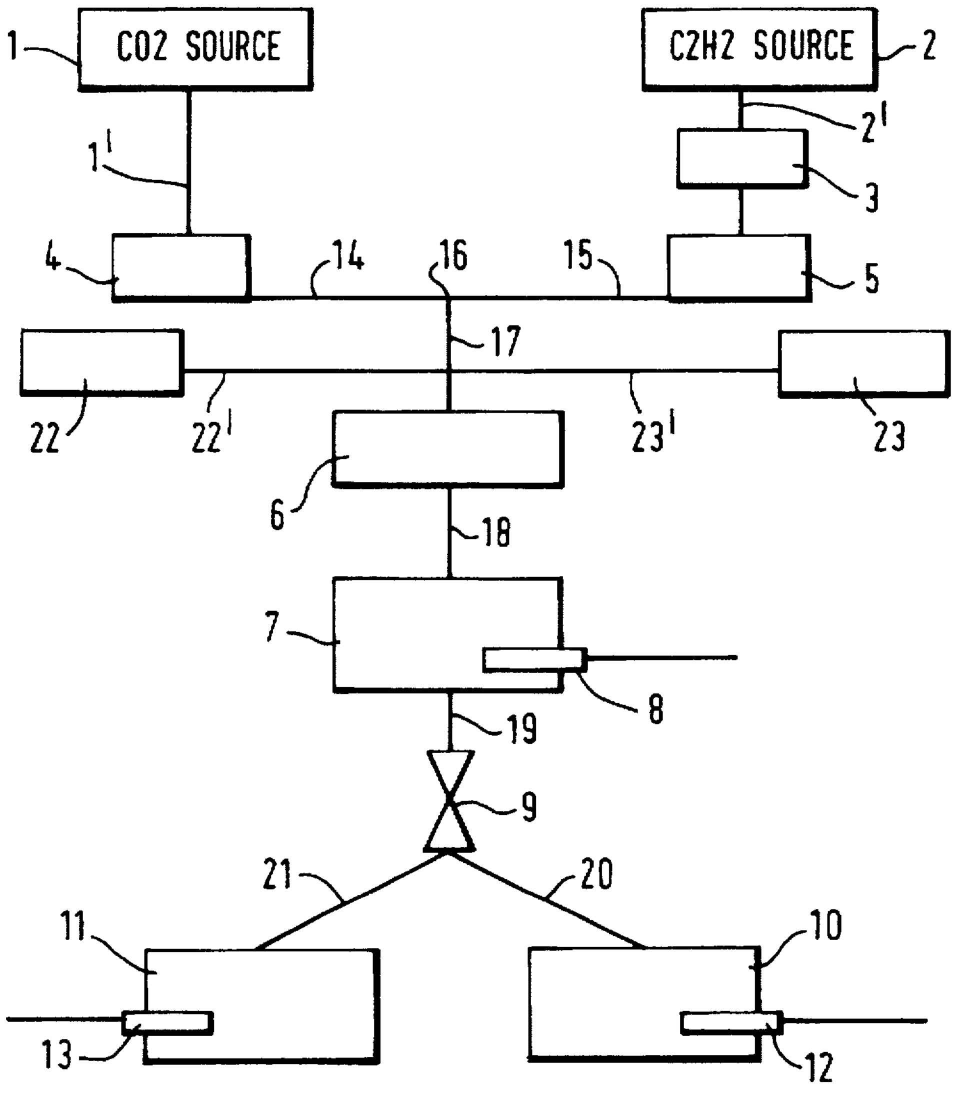
FIG. 2 is a schematic diagram of apparatus for the production and storage of a liquid or solid mixture of acetylene and carbon dioxide.

As shown in FIG. 2, apparatus for obtaining a liquid-vapour or a solid-vapour mixture of acetylene and carbon dioxide comprises a source 1 of carbon dioxide under pressure and a source 2 of acetylene gas under pressure. The source 2 can be either an acetylene generator or one or more cylinders of acetylene.

A line 1' extends from source 1 to a vaporiser/compressor 4 and likewise a line 2' extends from the source 2 to a compressor 5. Located in the line 2' between source 2 and the compressor 5 is a purifier unit 3.

Each compressor 4,5 is connected to a cooler unit 6 via lines 14, 15 junction 16 and line 17; and cooler unit 6 is connected in turn to a mixing vessel 7 via a line 18. The mixing vessel 7 is provided with cooling and heating units 8 for maintaining the vessel 7 at a required temperature and pressure.

Extending from the mixing vessel 7 is a line 19 which communicates with a valve 9. A first line 20 extends from the valve 9 to a first pressure vessel 10 and a second line 21 extends from the valve 9 to a second pressure vessel 11.

The first pressure vessel 10 includes a cooling unit 12 and the second pressure vessel 11 includes a cooling unit 13.

A source 22 of nitrogen communicates with the line 17 via a line 22'. Similarly, a vacuum pump 23 communicates with the line 17 via a line 23'.

In use, the apparatus is first tested for leaks using nitrogen from the source 22. When considered leak free the apparatus is then subjected to a vacuum of, for example 150 torr by means of the vacuum pump 23. The carbon dioxide gas from source 1 is then allowed to pass along line 1' to the compressor 4 and from the compressor 4 via line 14, junction 16 line 17 to cooler unit 6. Likewise, the acetylene gas from the source 2 is allowed to pass along line 2' through purifier unit 3 to the compressor 5 and from the compressor 5 via line 15, junction 16 line 17 to the cooler unit 6. The cooler unit 6 functions, if cooling of the gases is necessary after compression by the compressors 4,5.

From the cooler unit 6 the gases pass along line 18 to be injected into the mixing vessel 7, sequentially up to a pressure to achieve the required gas mixture composition. Preferable, carbon dioxide gas is first passed to the mixing vessel 7.

If a liquid mixture in equilibrium with its vapour is required, then the gas mixture from the mixing vessel 7 passes along line 19 and is expanded across valve 9 where it is cooled due to the Joule Thompson effect and is continuously transferred via line 20 to pressure vessel 10. The temperature of the pressure vessel 10 is controlled by means of the unit 12 to maintain the required conditions to keep the gas mixture in its liquid state.

Alternatively, the gas mixture in the pressure vessel 10 can have its temperature lowered by means of unit 12 sufficiently to produce a solid mixture in equilibrium with its vapour.

In a modification, the gaseous mixture in the mixing vessel 7 or the liquid mixture in the pressure vessel 10 could be snowed, that is, expanded through the valve 9 to produce a solid mixture in the second pressure vessel 11.

As indicated in the accompanying FIG. 1, a mixture of 70% by volume acetylene with 30% by volume carbon dioxide forms an azeotrope with equilibrium pressure of 7.6 bar, at −40° C. At these conditions, the azeotrope mixture gives a storage density of 423 $kg/m^3$ of mixture, which is more than twice the storage density of 192 $kg/m^3$ of solution of acetylene dissolved in acetone, at a pressure of 15 bar absolute and 20° C. The azeotropic mixture is particularly interesting since the mixture composition will not change during withdrawal of the liquid or vapour from its container.

EXAMPLE

Small Pilot Plant Scale

The system was first tested for leaks using nitrogen at 20 barg. After purging, the whole system was evacuated. The component gases acetylene and carbon dioxide were injected in the mixing vessel 7 in sequence. The gases behave ideally therefore, acetylene was added to a pressure of 9 bar absolute, then carbon dioxide was added until the pressure in the mixing vessel 7 reached 16.4 bar absolute. A mixture of 53% acetylene at ambient temperature and 14.9 bar absolute was obtained. The temperature of the pressure vessel 10 was adjusted to −23° C. by means of the unit 12 instead of cooling by expansion through the valve 9 due to the scale of the test. The gas mixture was transferred from the mixing vessel 7 to the pressure vessel 10 by pressure differential. The pressure was allowed to equilibrate and the required temperature of −23° C. was maintained. A pressure of 9.9 bar absolute was achieved in the pressure vessel 10.

This mixture did not explode under a fused platinum wire test.

Although the pressure vessel 10 is described with a cooling unit 12, it could be in the form of Dewar vessel, that is a vacuum insulated vessel.

We claim:

1. A method of preparing a liquefied mixture consisting of acetylene and carbon dioxide comprising the steps of mixing pressurized acetylene gas and pressurized carbon dioxide gas; reducing the temperature of the gas mixture thus obtained to obtain a liquid-vapour or solid-vapour mixture.

2. A method as claimed in claim 1, in which the gas mixture contains 50% to 90% by volume of acetylene the remainder being carbon dioxide.

3. A method as claimed in claim 1 or 2, in which the liquid-vapour or solid-vapour mixture is of azeotropic composition.

4. A method as claim 1 or 2, in which the mixture is at temperatures below the mixture critical temperature.

5. A liquefied mixture of acetylene and carbon dioxide consisting of 50 to 90% by volume acetylene and 50 to 10% by volume carbon dioxide.

* * * * *